United States Patent
Harvey et al.

(10) Patent No.: US 10,669,400 B1
(45) Date of Patent: *Jun. 2, 2020

(54) MULTIFUNCTIONAL PHOSPHATED POLYPHENOLS, THERMOPLASTICS, AND THERMOSETTING RESINS

(71) Applicant: The United States of America, as Represented by the Secretary of the Navy, Arlington, VA (US)

(72) Inventors: Benjamin G Harvey, Ridgecrest, CA (US); Matthew C Davis, Ridgecrest, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/813,457

(22) Filed: Nov. 15, 2017

(51) Int. Cl.
*C08K 5/523* (2006.01)
*C07F 9/12* (2006.01)
*C08G 65/24* (2006.01)
*C09K 21/14* (2006.01)
*C09K 21/12* (2006.01)
*C08G 61/10* (2006.01)
*C07F 9/09* (2006.01)

(52) U.S. Cl.
CPC .............. *C08K 5/523* (2013.01); *C08G 61/10* (2013.01); *C08G 65/24* (2013.01); *C09K 21/12* (2013.01); *C09K 21/14* (2013.01); *C07F 9/093* (2013.01); *C07F 9/12* (2013.01); *C08L 2201/02* (2013.01)

(58) Field of Classification Search
None
See application file for complete search history.

(56) References Cited

U.S. PATENT DOCUMENTS

| 8,853,343 | B1 | 10/2014 | Harvey et al. | |
| 8,993,688 | B1 | 3/2015 | Harvey et al. | |
| 8,993,689 | B1 | 3/2015 | Harvey et al. | |
| 9,018,314 | B1 | 4/2015 | Harvey et al. | |
| 9,051,414 | B1 | 6/2015 | Harvey et al. | |
| 9,127,115 | B1 | 9/2015 | Harvey et al. | |
| 9,187,591 | B1 | 11/2015 | Harvey et al. | |
| 2006/0030647 | A1* | 2/2006 | Ebeling | C08K 5/523 524/115 |
| 2018/0346815 | A1* | 12/2018 | King | C07F 9/1414 |

FOREIGN PATENT DOCUMENTS

CN 101691384 A * 4/2010

OTHER PUBLICATIONS

U.S. Appl. No. 15/257,525, Harvey et al.

* cited by examiner

*Primary Examiner* — Richard A Huhn
(74) *Attorney, Agent, or Firm* — Naval Air Warfare Center Weapons Division; Stuart H. Nissim

(57) ABSTRACT

A method for preparing fire resistant polymeric materials including, providing at least one first polyphenol having three or more phenolic groups, reacting at least one first polyphenol having three or more phenolic groups with at least one halophosphate and at least one first base to produce at least one second phenol having at least one phosphate group, and converting at least one second phenol having at least one phosphate group to a thermoplastic or thermosetting fire resistant polymeric material.

20 Claims, 6 Drawing Sheets

US 10,669,400 B1

MULTIFUNCTIONAL PHOSPHATED POLYPHENOLS, THERMOPLASTICS, AND THERMOSETTING RESINS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to methods to incorporate phosphate groups into a wide range of thermoplastics and thermosetting resins.

Figure 1:
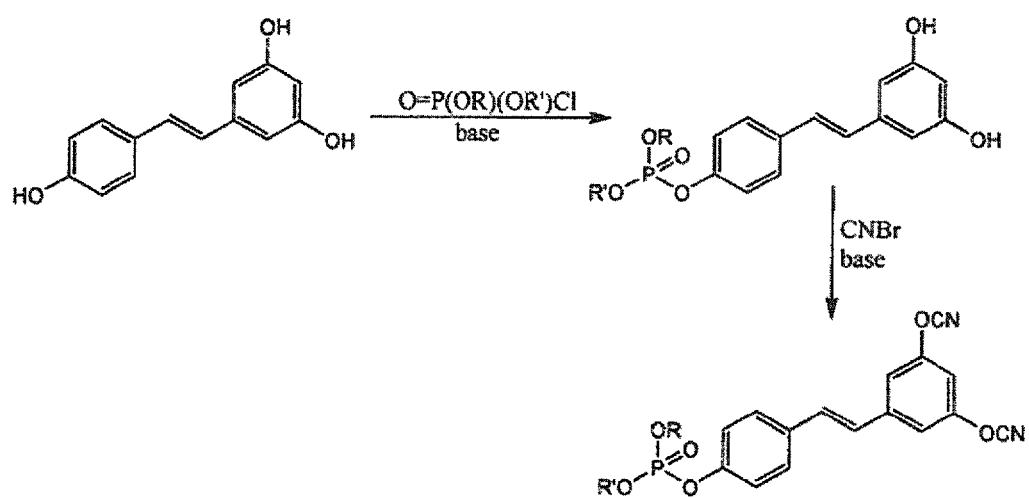
FIG. 1 is a chemical scheme showing the synthesis of a bis(cyanate) ester derived from trans-resveratrol functionalized with a phosphate group. R and R' are alkyl and/or aromatic groups, according to embodiments of the invention.
Figure 2:
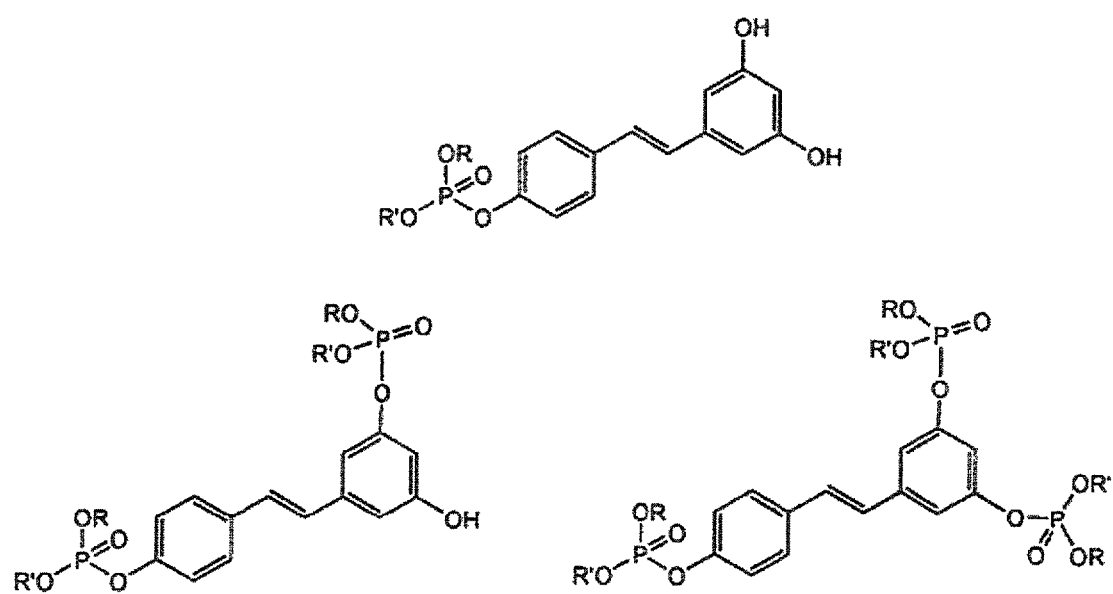
FIG. 2 are chemical structures of various phosphates derived from trans-resveratrol. R and R' are alkyl and/or aromatic groups, according to embodiments of the invention.
Figure 3:
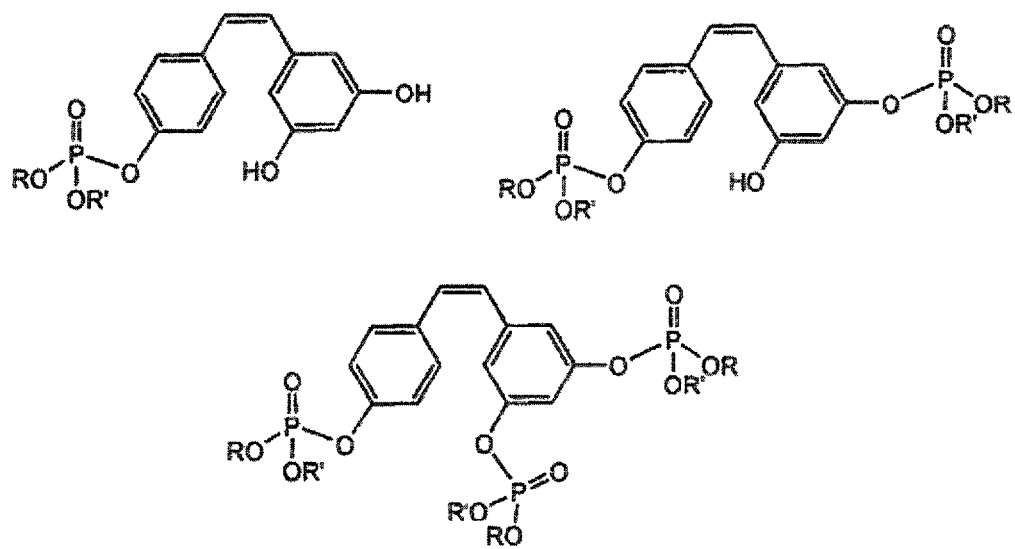
FIG. 3 are chemical structures of various phosphates derived from cis-resveratrol, R and R' are alkyl and/or aromatic groups, according to embodiments of the invention.
Figure 4:
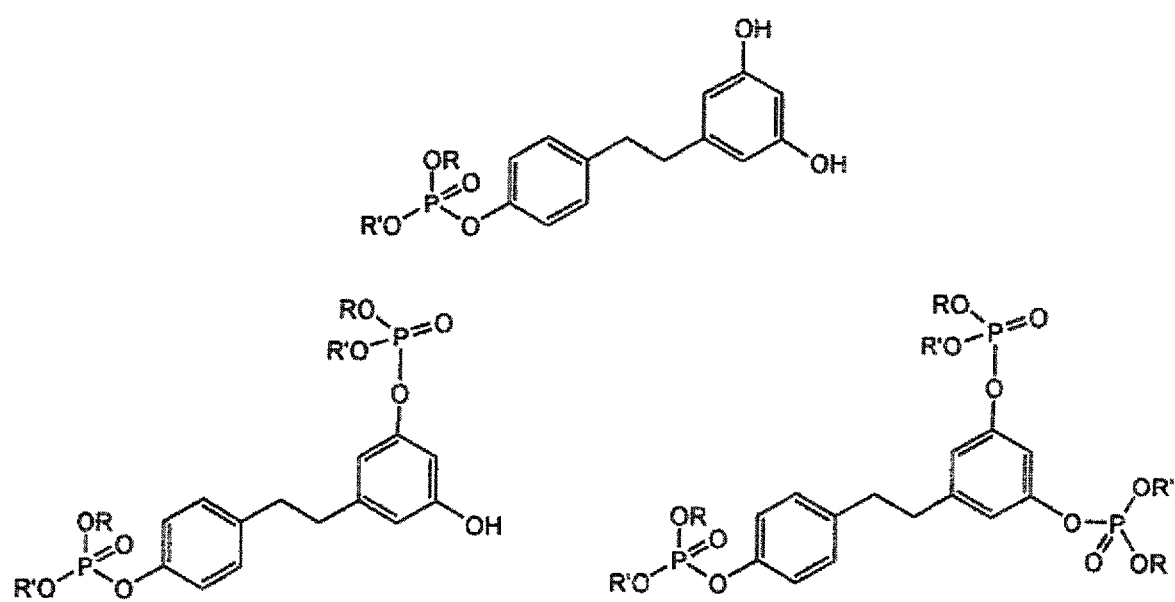
FIG. 4 are chemical structures of various phosphates derived from dihydroresveratrol. R and R' are alkyl and/or aromatic groups, according to embodiments of the invention.
Figure 5:
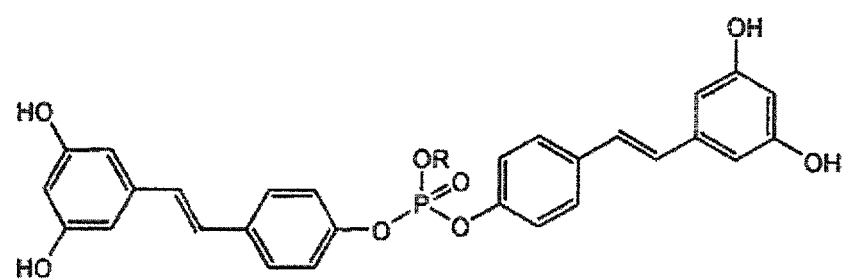
FIG. 5 is an example of a molecule with a bridging phosphate group synthesized from trans-resveratrol and a dichlorophosphate, R is an alkyl and/or aromatic group, according to embodiments of the invention.
Figure 6:
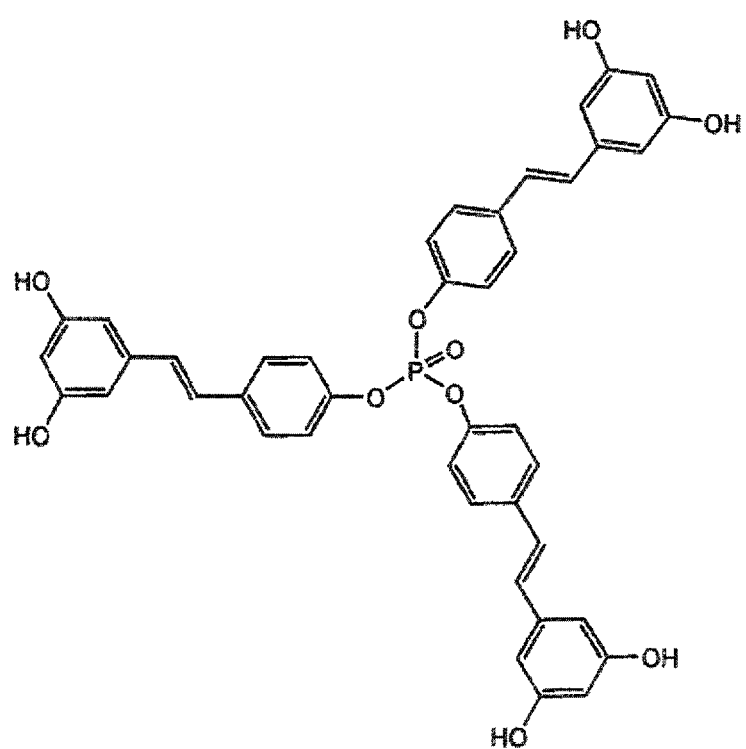
FIG. 6 is an example of a molecule with a central phosphate group synthesized from trans-resveratrol and a trichlorophosphate, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Embodiments of the invention generally relate to methods for the synthesis of fire resistant polymeric materials and additives that can be used in composite materials widely used throughout the Department of Defense (DoD). These polymers will increase the safety of the warfighter and reduce maintenance costs.

Embodiments of the invention describe methods to incorporate phosphate groups into a wide range of thermoplastics and thermosetting resins. These materials have increased fire resistance with reduced toxicity compared to conventional flame retardants.

Many thermoplastics and thermosetting resins are based on polyphenols. The selective incorporation of phosphate groups into multifunctional polyphenols allows for the synthesis of phosphate containing polymers and thermoset networks. These materials exhibit enhanced fire resistance compared to conventional materials. Many other fire-resistant polymers contain halogens and generate toxic HCl or HBr upon combustion. In contrast, phosphate containing polymers generate phosphoric acid upon combustion. The phosphoric acid is not volatile and aids in the formation of char that protects the underlying polymer from continued flame exposure. Selective incorporation of phosphate groups also allows for control of molecular weight as well as the thermal and mechanical properties of derivative polymers. This disclosure describes methods to synthesize monomers that contain variable amounts of phosphate while maintaining enough functional groups to allow for effective polymerization of the monomer. The disclosure also includes methods to form monomers with higher cross-link densities compared to conventional monomers which results in enhanced glass transition temperatures and higher thermo-oxidative stability. Finally, in embodiments of the invention, the bio-based polyphenol, resveratrol, and other derivative phenols are used as monomer precursors. These precursors can be derived from biomass sugars, providing a sustainable route to advanced composites.

Below are methods for making fire resistant polymeric materials.

1. A polyphenol having three or more phenolic groups is provided.
2. The polyphenol is allowed to react with a halophosphate to generate molecules or blends of molecules including phosphate groups.
3. The phosphate including monomer or blend of monomers is then either directly polymerized to a phosphate including thermoplastic or converted to a reactive monomer.
4. Phosphate including thermosetting monomers are combined with a support material and thermally cured to generate a fire resistant composite material.

The following is detailed explanation of embodiments of the invention.

1. A polyphenol is provided. In embodiments the polyphenol is trans-resveratrol, cis-resveratrol, blends of trans- and cis-resveratrol, or dihydroresveratrol. In other embodiments the polyphenol has three or more hydroxy groups or is a phenolic oligomer with between 3 and 100 hydroxy groups.

2. The polyphenol is allowed to react with one or more equivalents of a halophosphate in the presence of base. In embodiments, trans-resveratrol, cis-resveratrol, blends of trans- and cis-resveratrol, or dihydroresveratrol are allowed to react with one equivalent of a halophosphate to generate molecules including two hydroxy groups and one phosphate group. In other embodiments, the ratio of phosphate is controlled between about 0.1 molar equivalents and 2 molar equivalents for trifunctional polyphenols. In embodiments, polyphenols may have the formula R(OH)x(phosphate)y, where R is an aromatic group or polyaromatic group, x is an integer $>/=2$ and y is an integer $>/=1$. In other embodiments dihalophosphates or trihalophosphates are used to generate phosphate-bridged polyphenols and derivative thermosetting resins/polymers.

3. Phosphate including polyphenols can be polymerized using methods known in the art. In embodiments the phosphate including polyphenols are converted to polycarbonates. In other embodiments the phosphate including polyphenols are converted to cyanate esters by reaction with cyanogen halides in the presence of base. The phosphate including polyphenols can also be converted to phthalonitriles, poly ether ether ketones (PEEK), polyesters, polysulfones, epoxies, bismaleimides, benzoxazines, and polyimides.

4. Polymers or polymer blends prepared from the phosphate including polyphenols are combined with support materials and thermally cured to generate composite materials. Examples of suitable support materials include carbon fibers, carbon nanotubes, glass fibers, and quartz fibers.

Resveratrol-derived cyanate esters are described in U.S. Pat. Nos. 9,187,591, 9,127,115, 9,051,414, 9,018,314, 8,993,689, 8,993,688, and 8,853,343 (all held by US Navy, NAWCWD). Cyanate esters with a phosphate core are described in U.S. patent Ser. No. 15/257,525.

Although embodiments of the invention are described in considerable detail, including references to certain versions thereof, other versions are possible. Therefore, the spirit and scope of the appended claims should not be limited to the description of versions included herein.

trans-Resveratrol-4'-(diphenylphosphate)

trans-Resveratrol (8 g, 35 mmol) was dissolved in anhydrous DMF (100 mL). After all the solids dissolved, diphenyl chlorophosphate (11.33 g, 8.78 mL, 42 mmol, 1.2 equiv) was added. After complete dissolution, triethylamine (4.24 g, 42 mmol, 1.2 equiv) was added dropwise over 1 h. After the addition, the mixture was stirred at ambient temperature for 18 h. The reaction mixture was then partitioned between $H_2O$ and EtOAc. The organic layer was washed with $H_2O$ and then with brine and was dried over anhydrous $MgSO_4$. The solvent was then removed under reduced pressure to yield a thick brown oil. The crude product was dissolved in toluene and incubated several hours which caused unreacted trans-resveratrol to precipitate. The mixture was filtered and the solvent was removed under reduced pressure. The crude brown oil was chromatographed on silica gel eluting with Hexanes/EtOAC (3/1 to 1/1). The fractions containing the product, the lower spot showing a characteristic strong blue fluorescence under short wave UV irradiation (TLC), were collected. Removal of the solvent under reduced pressure afforded the product in pure form as a brown-orange oil (2 g, 12%). $^1$H NMR (DMSO, δ, ppm): 9.27 (s, 2 OH), 7.65 (d, J=8.5 Hz, 2H), 7.51-7.42 (m, 4H), 7.34-7.21 (m, 8H), 7.04 (2, 2H), 6.43 (d, J=2.1 Hz, 2H), 6.16 (t, J=1.8 Hz, 1H).

trans-Resveratrol-3,5-dicyanate-4'-(diphenylphosphate)

trans-Resveratrol-4'-(diphenylphosphate) (2 g, 4.3 mmol) was dissolved in anhydrous THF (25 mL) and magnetically stirred and cooled to −78° C. In one portion, BrCN (1.38 g, 13 mmol, 3 equiv) was added and allowed to dissolve completely. Then, triethylamine (960 mg, 9.6 mmol, 2.2 equiv) was added dropwise over 20 min. $NEt_3 \cdot HBr$ precipitated during the addition of the base. The cooling bath was removed and the mixture was stirred at ambient temperature for 1 h. Afterwards, the mixture was partitioned between $H_2O$ (250 mL) and EtOAc (100 mL). The organic layer was washed again with $H_2O$ and then with brine. After drying the organic layer over anhydrous $MgSO_4$, the solvent was removed under reduced pressure to yield a pale yellowish oil. The crude product was chromatographed on silica gel eluting with hexanes/EtOAc (3/1 to 1/1). The fractions containing the product were combined and the solvent was removed under reduced pressure to afford the product as a viscous oil. After storage in vacuo for several days, the product began to crystallize. The product was slurried with a mixture of isopropanol/MeCN (3/1) and the solid was collected on medium filter paper (500 mg, 22%). $^1$H NMR ($CDCl_3$, δ, ppm): 7.53 (d, J=8.6 Hz, 2H), 7.45-7.15 (m, 15H), 7.11 (t, J=2.3 Hz, 1H), 6.99 (d, J=16.1 Hz, 1H).

trans-Resveratrol tris(diphenyl phosphate) (trans RTP)

trans-Resveratrol (11.53 g, 50.6 mmol) was dissolved in anhydrous THF (500 mL) and then diphenyl chlorophosphate (44 g, 33.9 mL, 164 mmol, 3.25 equiv) was added. After complete dissolution, triethylamine (20.44 g, 202 mmol, 4 equiv) was added dropwise over 1 h. The reaction became warm to the touch as the base was added and a fine precipitate of $NEt_3 \cdot HCl$ also formed. The reaction was stirred for 18 hours at ambient temperature. Afterwards, the reaction mixture was partitioned between $H_2O$ (500 mL) and toluene (1 L). The organic phase was washed with copious $H_2O$ (10×500 mL) and then with brine (500 mL). The organic layer was dried over anhydrous $MgSO_4$ and the solvent was then removed under reduced pressure. The resulting thick oil was chromatographed on silica gel (Hexanes/EtOAc: 3/2) and fractions containing the product were collected. The solvent was removed under reduced pressure to yield a thick colorless oil. Residual solvent was removed by heating the oil to 35° C. and placing under high vacuum overnight. Yield: 62%. $^1$H NMR ($CDCl_3$, δ, ppm): 7.5-7.15 (m, 36H), 7.07 (m, 1H), 6.9 (d, Jab=16.3 Hz, 2H). $^{13}$C NMR ($CDCl_3$, δ, ppm): 151.42 (d, JPC=7.3 Hz), 150.63 (d, JPC=7.8 Hz), 150.53 (d, JPC=7.8 Hz), 140.61 (t, JPC=1.0 Hz), 134.17 (d, JPC=1.2 Hz), 130.33, 130.15 (d, JPC=1.1 Hz), 130.10, 128.37 (d, JPC=1.1 Hz), 126.96, 125.99 (d, JPC=1.6 Hz), 125.89 (d, JPC=1.3 Hz), 120.71 (d, JPC=5.0 Hz), 120.32 (d, JPC=4.9 Hz), 120.24 (d, JPC=5.0 Hz), 115.48 (d, JPC=4.9 Hz), 111.79 (t, JPC=5.6 Hz). 31P NMR ($CDCl_3$, δ, ppm): −17.42 (1P), −17.64 (2P). Anal. Calcd for $C_{50}H_{39}O_{12}P_3$: C, 64.94; H, 4.25. Found: C, 65.16; H, 4.33.

cis-Resveratrol tris(diphenyl phosphate) (cis RTP)

cis RTP was made by a similar procedure to that used for trans RTP. The product was isolated in 55% yield starting from cis-resveratrol (7.63 g, 33.5 mmol), diphenyl chlorophosphate (27.4 mL), and triethylamine (13.5 g, 134 mmol). The compound was also a colorless oil with significantly lower viscosity compared to the trans isomer. $^1$H NMR ($CDCl_3$, δ, ppm): 7.40-7.10 (m, 33H), 7.09-6.99 (m, 4H), 6.59 (d, J=12.2 Hz, 1H), 6.46 (d, J=12.2 Hz, 1H). 13C NMR ($CDCl_3$, δ, ppm): 151.11 (d, JPC=7.3 Hz), 150.59 (d, JPC=7.8 Hz), 150.42 (d, JPC=7.6 Hz), 149.89 (d, JPC=7.6 Hz), 140.37 (d, JPC=1.0 Hz), 133.59 (d, JPC=1.7 Hz), 131.39, 130.56, 130.09, 130.08, 130.05, 128.30, 125.91 (d, JPC=1.0 Hz), 125.81 (d, JPC=1.2 Hz), 120.30 (d, JPC=4.9 Hz), 120.27 (d, JPC=4.8 Hz), 120.21 (d, JPC=5.0 Hz), 117.88 (d, JPC=5.2 Hz), 111.71 (t, JPC=5.2 Hz). $^{31}$P NMR ($CDCl_3$, δ, ppm): −17.52. Anal. Calcd for $C_{50}H_{39}O_{12}P_3$: C, 64.94; H, 4.25. Found: C, 65.18; H, 4.28.

Prophetic Examples

Prophetic examples are for illustration purposes only and not to be used to limit any of the embodiments.

Embodiments of the invention generally relate to methods for preparing fire resistant polymeric materials including, providing at least one first polyphenol having three or more phenolic groups, reacting at least one first polyphenol having three or more phenolic groups with at least one halophosphate and at least one first base to produce at least one second phenol having at least one phosphate group, and converting at least one second phenol having at least one phosphate group to a thermoplastic or thermosetting fire resistant polymeric material. Another aspect of the invention relates to fire resistant polymeric material including bis(cyanate) esters, other thermosetting resins, thermoplastic polymers, and these materials produced by the methods herein.

Another aspect of the invention relate to mono(phosphates) having one of the following formulas including:

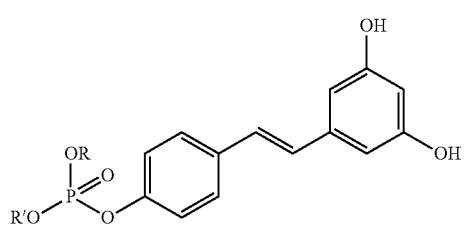

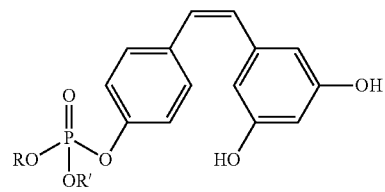

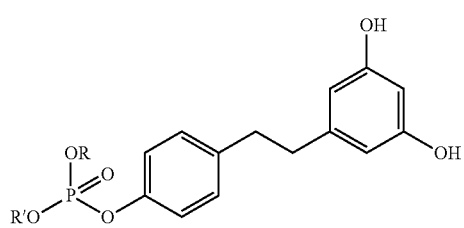

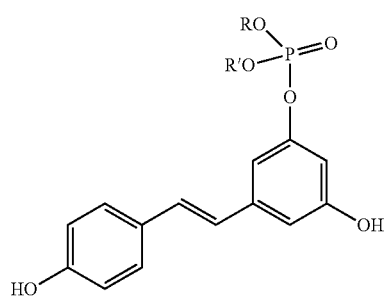

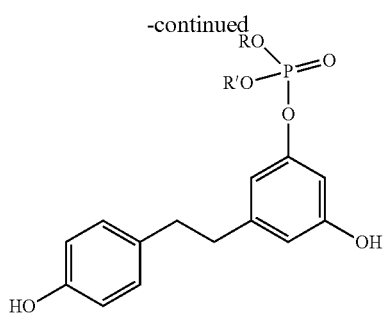

where R and R' are alkyl, aliphatic, or combinations of alkyl and aliphatic groups.

Another aspect of the invention relate to bis(phosphates) having one of the following formulas including:

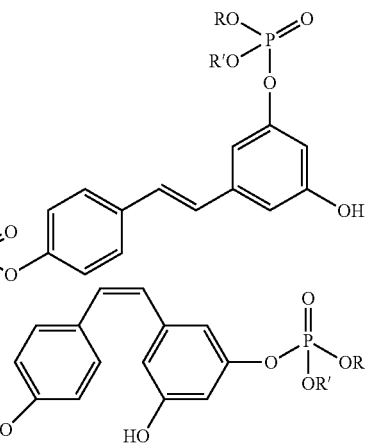

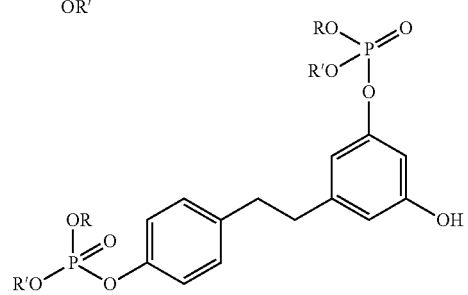

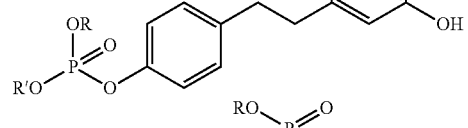

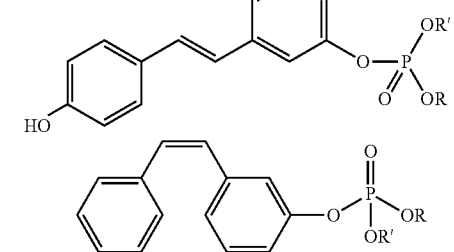

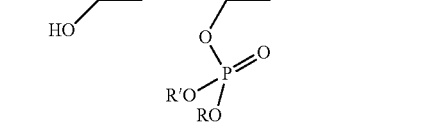

-continued

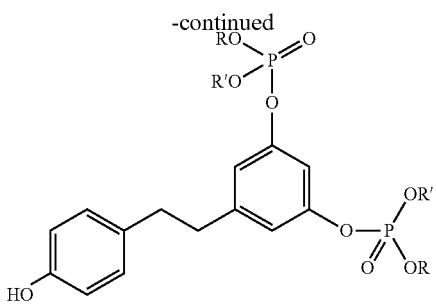

where R and R' are alkyl, aliphatic, or combinations of alkyl and aliphatic groups.

Another aspect of the invention relate to tris(phosphates) having one of the following formulas, comprising:

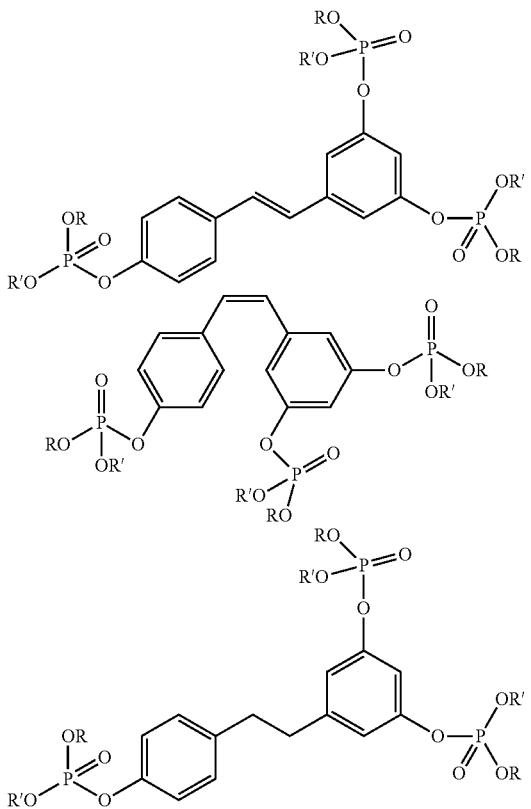

where R and R' are alkyl, aliphatic, or combinations of alkyl and aliphatic groups.

Another aspect of the invention relates to methods for preparing fire resistant polymeric materials including, providing at least one first polyphenol having three or more phenolic groups, reacting at least one first polyphenol having three or more phenolic groups with at least one dihalophosphate and at least one first base to produce at least one second phenol having one or more bridging phosphate groups, and converting at least one second phenol having at least one bridging phosphate group to a thermoplastic or thermosetting fire resistant polymeric material.

Yet another aspect of the invention relates to methods for preparing fire resistant polymeric materials including, providing at least one first polyphenol having three or more phenolic groups, reacting at least one first polyphenol having three or more phenolic groups with at least one trihalophosphate and at least one first base to produce at least one second phenol having at least one bridging phosphate group, and converting at least one second phenol having at least one bridging phosphate group to a thermoplastic or thermosetting fire resistant polymeric material.

Another aspect of the invention relates to methods for preparing fire resistant polymeric materials including, providing at least one first polyphenol having three or more phenolic groups, reacting all of the phenols with a halophosphate and at least one first base to produce a fully phosphated aromatic compound, and blending the fully phosphated aromatic compound with a thermoplastic or thermosetting polymeric material at loadings of about 0.1% to about 50%.

In embodiments, the second phenol having one or more bridging phosphate groups has between 4 and 10,000 aromatic rings. In embodiments, the second phenol having at least one bridging phosphate group has between 6 and 10,000 aromatic rings. In embodiments, the first polyphenol includes trans-resveratrol, cis-resveratrol, blends of trans- and cis-resveratrol, dihydroresveratrol, 5,5'-(ethane-1,2-diyl)bis(benzene-1,3-diol), 1,1,1-tris(4-hydroxyphenyl)methane, and any combinations thereof. In other embodiments, the first base includes an amine, including triethylamine or pyridine, alkali earth hydroxides, alkaline earth hydroxides, alkali earth alkoxides, alkaline earth alkoxides, and any combinations thereof. In other embodiments, the halophosphate includes chlorophosphate, bromophosphate, iodophosphate, and any combinations thereof.

In embodiments, the fire resistant polymeric material includes thermoset resins and/or thermoplastics. In other embodiments, the thermoset resins include cyanate esters, epoxies, benzoxazines, phthalonitriles, and any combinations thereof. In other embodiments, the thermoplastics include polycarbonates, polyurethanes, polysulfones, polyesters, polyarylates, alkylphenolics, and any combinations thereof. In embodiments, the polyphenol having at least one phosphate group is converted to a cyanate ester resin by reaction with a cyanogen halide or pseudohalide in the presence of a second base. In embodiments, the second polyphenol having at least one phosphate group is converted to an epoxy resin by reaction with epichlorohydrin in the presence of a base.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for preparing fire resistant polymeric materials, comprising:
   providing at least one first polyphenol having three or more phenolic groups;
   reacting said at least one first polyphenol having three or more phenolic groups with at least one halophosphate and at least one first base to produce at least one second phenol having at least one phosphate group; and
   converting said at least one second phenol having at least one phosphate group to a thermoplastic or thermosetting fire resistant polymeric material;
   wherein said at least one first polyphenol comprises cis-resveratrol, blends of trans- and cis-resveratrol, dihydroresveratrol, 5,5'-(ethane-1,2-diyl)bis(benzene-1,3-diol), 1,1,1-tris(4-hydroxyphenyl) methane, and any combinations thereof.

2. The method according to claim 1, wherein said at least one first base comprises an amine, including triethylamine or pyridine, alkali earth hydroxides, alkaline earth hydroxides, alkali earth alkoxides, alkaline earth alkoxides, and any combinations thereof.

3. The method according to claim 1, wherein said at least one halophosphate comprises chlorophosphate, bromophosphate, iodophosphate, and any combinations thereof.

4. The method according to claim 1, wherein said at least one fire resistant polymeric material comprises thermoset resins and/or thermoplastics.

5. The method according to claim 4, wherein said at least one thermoset resins comprises cyanate esters, epoxies, benzoxazines, phthalonitriles, and any combinations thereof.

6. The method according to claim 4, wherein said at least one thermoplastics comprises polycarbonates, polyurethanes, polysulfones, polyesters, polyarylates, alkylphenolics, and any combinations thereof.

7. The method according to claim 4, wherein said second phenol having at least one phosphate group is converted to a cyanate ester resin by reaction with a cyanogen halide or pseudohalide in the presence of a second base.

8. The method according to claim 4, wherein said second phenol having at least one phosphate group is converted to an epoxy resin by reaction with epichlorohydrin in the presence of a base.

9. The method according to claim 4, wherein said at least one fire resistant polymeric material is bis(cyanate) esters.

10. Thermosetting resins produced by the method in claim 5.

11. Thermoplastic polymers produced by the method in claim 6.

12. Bis(cyanate) esters produced by the method in claim 9.

13. Fire resistant polymeric materials produced by the method in claim 1.

14. A mono(phosphate) having one of the following formulas, comprising:

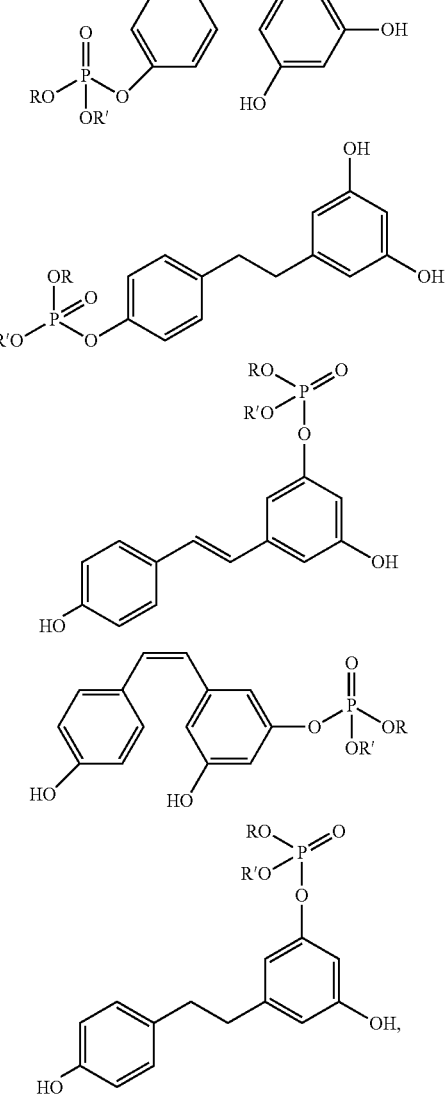

wherein R and R' are alkyl, aliphatic, or combinations of alkyl and aliphatic groups.

15. A bis(phosphate) having one of the following formulas, comprising:

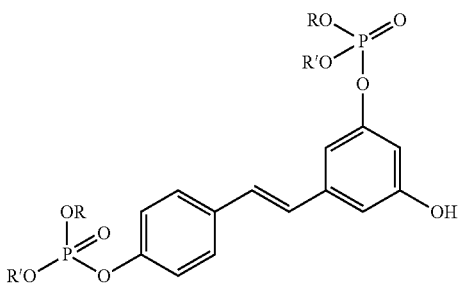

-continued

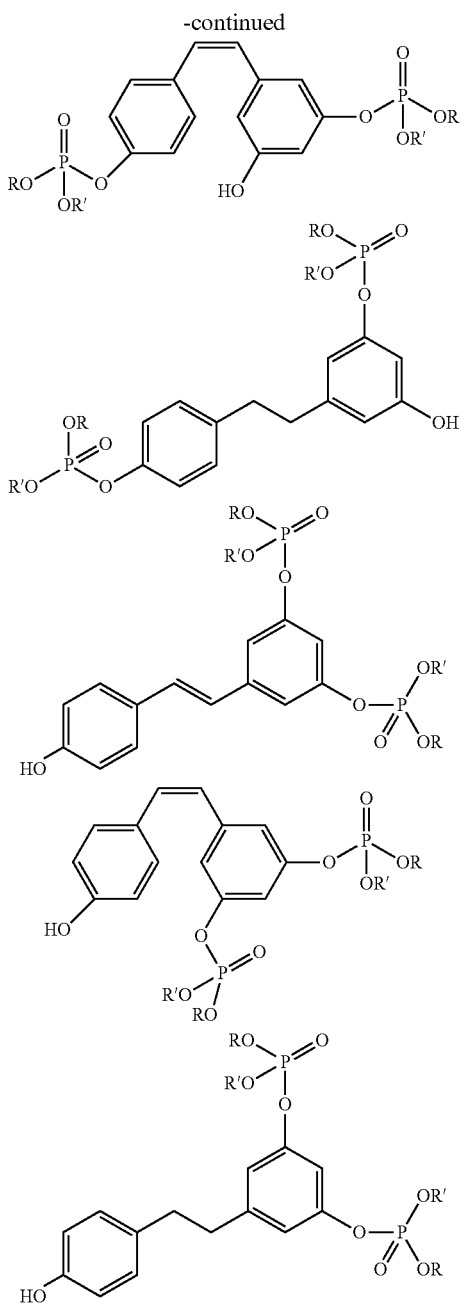

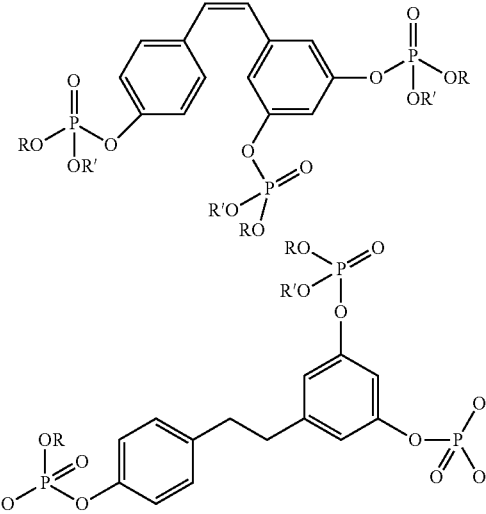

wherein R and R' are alkyl, aliphatic, or combinations of alkyl and aliphatic groups.

16. A tris(phosphate) having one of the following formulas, comprising:

wherein R and R' are alkyl, aliphatic, or combinations of alkyl and aliphatic groups.

17. A method for preparing fire resistant polymeric materials, comprising:
  providing at least one first polyphenol having three or more phenolic groups;
  reacting said at least one first polyphenol having three or more phenolic groups with at least one dihalophosphate and at least one first base to produce at least one second phenol having one or more bridging phosphate groups; and
  converting said at least one second phenol having at least one bridging phosphate group to a thermoplastic or thermosetting fire resistant polymeric material.

18. The method according to claim 17, wherein said second phenol having one or more bridging phosphate groups has between 4 and 10,000 aromatic rings.

19. A method for preparing fire resistant polymeric materials, comprising:
  providing at least one first polyphenol having three or more phenolic groups;
  reacting said at least one first polyphenol having three or more phenolic groups with at least one trihalophosphate and at least one first base to produce at least one second phenol having at least one bridging phosphate group; and
  converting said at least one second phenol having at least one bridging phosphate group to a thermoplastic or thermosetting fire resistant polymeric material.

20. The method according to claim 19, wherein said second phenol having at least one bridging phosphate group has between 6 and 10,000 aromatic rings.

* * * * *